US009610896B2

(12) United States Patent
Lang et al.

(10) Patent No.: US 9,610,896 B2
(45) Date of Patent: Apr. 4, 2017

(54) DEVICE THAT ELECTRICALLY AND ROTATIONALLY ADJUSTS AN INDIRECT VISUAL SYSTEM OF A VEHICLE

(71) Applicant: Mekra Lang GmbH & Co. KG, Ergersheim (DE)

(72) Inventors: Werner Lang, Ergersheim (DE); Elmar Finkenberger, Adelshofen (DE); Albrecht Popp, Weihenzell (DE); Stefan Centmayer, Ergersheim (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 263 days.

(21) Appl. No.: 14/165,304

(22) Filed: Jan. 27, 2014

(65) Prior Publication Data
US 2014/0211333 A1 Jul. 31, 2014

(30) Foreign Application Priority Data
Jan. 29, 2013 (DE) .......................... 10 2013 201 434

(51) Int. Cl.
*H02K 7/14* (2006.01)
*B60R 1/072* (2006.01)
(Continued)

(52) U.S. Cl.
CPC .............. *B60R 1/072* (2013.01); *B60R 1/074* (2013.01); *F16D 7/04* (2013.01); *H02K 7/14* (2013.01)

(58) Field of Classification Search
CPC .......... B60R 1/072; B60R 1/074; H02K 7/14; F16D 7/04
(Continued)

(56) References Cited

U.S. PATENT DOCUMENTS 6,243,218 B1 * 6/2001 Whitehead .............. B60R 1/072
359/841
6,390,630 B1 5/2002 Ochs ............................ 359/841
(Continued)

FOREIGN PATENT DOCUMENTS

CN 101348094 7/2008
CN 101565021 4/2009
(Continued)

OTHER PUBLICATIONS

Extended Search Report dated Apr. 9, 2014 from the European Patent Office in the related foreign application EP1415778.8 (6 pages).
(Continued)

*Primary Examiner* — Shawki S Ismail
*Assistant Examiner* — Muhammad S Islam
(74) *Attorney, Agent, or Firm* — Imperium Patent Works; Darien K. Wallace

(57) ABSTRACT

A adjusting device for a vehicular mirror directly transmits any forces exerted on the mirror between a base member and a rotating member when the mirror is not being adjusted. This permits a small electric motor to be used that can withstand only comparatively small forces exerted on the mirror while the mirror is being adjusted. The device includes the motor, a cylindrical base, a rotating member and a driven member. The mirror is adjusted when the motor drives the rotating member, and the rotating member is uncoupled from the base member. When the motor rotates the driven member, the rotating member is forced axially apart from the base member as a decoupling element on the rotating member slides up an inclined portion on the driven member. When the motor is not driving the rotating member, the rotating member is uncoupled from the motor and couples to the base member.

20 Claims, 7 Drawing Sheets

(51) Int. Cl.
  *B60R 1/074*  (2006.01)
  *F16D 7/04*  (2006.01)
(58) Field of Classification Search
  USPC .................. 359/870, 841, 871, 877, 872
  See application file for complete search history.

(56) References Cited

U.S. PATENT DOCUMENTS

| | | | |
|---|---|---|---|
| 7,686,274 B2 | 3/2010 | Branham | 248/477 |
| 2002/0001148 A1* | 1/2002 | Fuchs | B60R 1/076 |
| | | | 359/872 |
| 2007/0035862 A1 | 2/2007 | Brouwer et al. | 359/841 |
| 2008/0149803 A1 | 6/2008 | Yoshida et al. | 248/479 |
| 2008/0259474 A1 | 10/2008 | Onuki | 359/841 |
| 2009/0021034 A1 | 1/2009 | Tilg et al. | 296/1.11 |
| 2009/0040639 A1 | 2/2009 | Onuki | 359/877 |
| 2009/0229962 A1* | 9/2009 | Brouwer | B60R 1/074 |
| | | | 200/405 |
| 2011/0141591 A1 | 6/2011 | Iseki | 359/841 |
| 2011/0235200 A1 | 9/2011 | Sakata | 359/841 |
| 2011/0261476 A1* | 10/2011 | Van Stiphout | F16H 35/10 |
| | | | 359/877 |

FOREIGN PATENT DOCUMENTS

| | | |
|---|---|---|
| DE | 19953484 | 11/1999 |
| EP | 0881124 | 5/1998 |
| EP | 1129907 | 12/2000 |
| EP | 1129907 B1 | 12/2000 |
| EP | 1755923 | 4/2005 |
| EP | 1908635 | 9/2007 |
| EP | 2436559 | 10/2010 |
| JP | H02-008435 | 1/1990 |
| JP | 2008-087706 | 10/2006 |
| JP | 2008-155804 | 12/2006 |
| JP | 2008155804 A | 12/2006 |
| JP | 2005-193818 | 1/2008 |
| JP | 2011-201447 | 3/2010 |
| KR | 1020070022224 | 9/2006 |
| KR | 1020080105995 | 5/2008 |
| WO | WO 91/04172 | 9/1989 |

OTHER PUBLICATIONS

Office action dated Nov. 8, 2013, from the German Patent Office in the related foreign application DE102013201434.1 (6 pages).
Office action dated Sep. 28, 2015, from the Chinese Patent Office in the related foreign application CN201410021545.0 (9 pages) and an English translation of the Chinese Office Action (10 pages).
Office action dated Sep. 29, 2015, from the Japanese Patent Office in the related foreign application JP2014-009039 (6 pages) and an English translation of the Japanese Office Action (6 pages).
Office action dated Dec. 14, 2015, from the Russian Patent Office in the related foreign application RU2014102710/11 (4 pages) and an English translation of the Russian Office Action (3 pages).
Notice of Allowance dated Feb. 1, 2016, from the Korean Patent Office in the related foreign application KR10-2014-0011486 together with an English translation of the Korean Notice (3 pages).
Office action dated Oct. 9, 2016, from the Chinese Patent Office in the related foreign application CN201410021545.0 (8 pages).
English translation of Chinese Office action dated Oct. 9, 2016 in application CN201410021545.0 (10 pages).

* cited by examiner

DEVICE THAT ELECTRICALLY AND ROTATIONALLY ADJUSTS AN INDIRECT VISUAL SYSTEM OF A VEHICLE

CROSS REFERENCE TO RELATED APPLICATION

This application is based on and hereby claims the benefit under 35 U.S.C. §119 from German Patent Application No. DE 102013201434.1, filed on Jan. 29, 2013, in the German Patent Office. This application is a continuation-in-part of German Patent Application No. DE 102013201434.1, the contents of which is incorporated herein by reference.

TECHNICAL FIELD

The present invention relates generally to the field of indirect visual systems for vehicles and, more particularly, to a device that electrically and rotationally adjusts such visual systems.

BACKGROUND

Electrically rotational adjusting units for folding in and/or adjusting indirect visual systems in vehicles are known. For example, EP1755923 B1 describes an electric rotary actuator that is arranged between a base member and a rotating member so that the electric rotary actuator must be designed to transmit and absorb the forces and moments acting between the base member and the rotating member. This design results in comparatively large and heavy components and thus a comparatively large and heavy electrically rotational adjusting unit. Therefore, a device is sought for rotationally adjusting an indirect visual system of a vehicle that is smaller than the conventional design and that allows more lightweight components to be used.

SUMMARY

A device for folding an external side mirror of a vehicle in and out includes and electric motor, a cylindrical base and a rotating member. The electric motor is adapted to drive the rotating member. The mirror is adjusted when the electric motor is driving the rotating member and the base member is uncoupled from the rotating member. When the electric motor is not driving the rotating member, the rotating member is uncoupled from the electric motor and coupled to the base member in a rotationally fixed manner.

The base member is cylindrical and has first coupling elements, and the rotating member has second coupling elements. The base member and the rotating member are coaxially aligned. The first coupling members point in an axial direction, and the second coupling members point in a direction opposite to the axial direction in which the first coupling members point. The first coupling members mesh into the second coupling members and couple the base member to the rotating member in a rotationally fixed manner when the electric motor is not driving the rotating member. The first coupling members are uncoupled from the second coupling members when the electric motor is driving the rotating member.

The device for adjusting a mirror also includes a cylindrical driven member that is coaxially aligned with both the base member and the rotating member. The driven member is disposed inside the base member. The electric motor rotates the driven member using Wolfrom planetary gears. The driven member includes a driving element that points in an axial direction, and the rotating member includes a decoupling element that points in a direction opposite to the axial direction in which the driving element points. The rotating member is forced axially apart from the base member by the decoupling element when the electric motor drives the driven member and rotates the driven member up to a decoupling angle $\Phi$. The driven member also includes an inclined portion. Both the driving element and the inclined portion are formed on a rim of the driven member. As the driven member is rotated up to the decoupling angle $\Phi$ and the decoupling element slides up the inclined portion, the rotating member is forced axially apart from the base member, and the first coupling members are uncoupled from the second coupling members.

When the electric motor rotates the driven member past the decoupling angle $\Phi$, the axially oriented driving element on the driven member engages the decoupling element on the rotating member and rotates the rotating member, which in turn moves the mirror. When the electric motor stops driving the rotating member, the decoupling element slides downwards along the inclined portion assisted by a spring, and the first coupling members recouple to the second coupling members.

The device for adjusting an indirect visual system, such as a mirror, also includes a sensor and control device and a mechanical stop. The sensor and control device senses an increased current through the electric motor when the driven member reaches a mechanical stop after being rotated by the electric motor.

The invention provides an electrical rotational adjusting unit, especially for indirect visual systems for vehicles, in which components of lower stability can be used. In a neutral position in which the electric motor of the electric rotary actuator is deactivated, a coupling device couples the base member to the rotating member in a rotationally fixed manner. When the electric rotary actuator is activated, the base member is uncoupled from the rotating member, and the electric rotary actuator is coupled to the rotating member. By coupling and uncoupling the electric rotary actuator in this manner, the forces and moments occurring during normal use of the mirror and while the mirror is not being adjusted are transmitted directly between the base member and the rotating member through the coupling device. The direct and immediate coupling between the base member and the rotating member is disengaged only when the electric rotary actuator is activated, for example when the mirror is folded into a parking position. The electric rotary actuator is activated for only a short time or for a period of time during which it can be ensured that no excessive force is being exerted on the base member and the rotating member. Consequently, the electric rotary actuator can be designed to be appropriately small and to withstand only comparatively small forces and moments.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
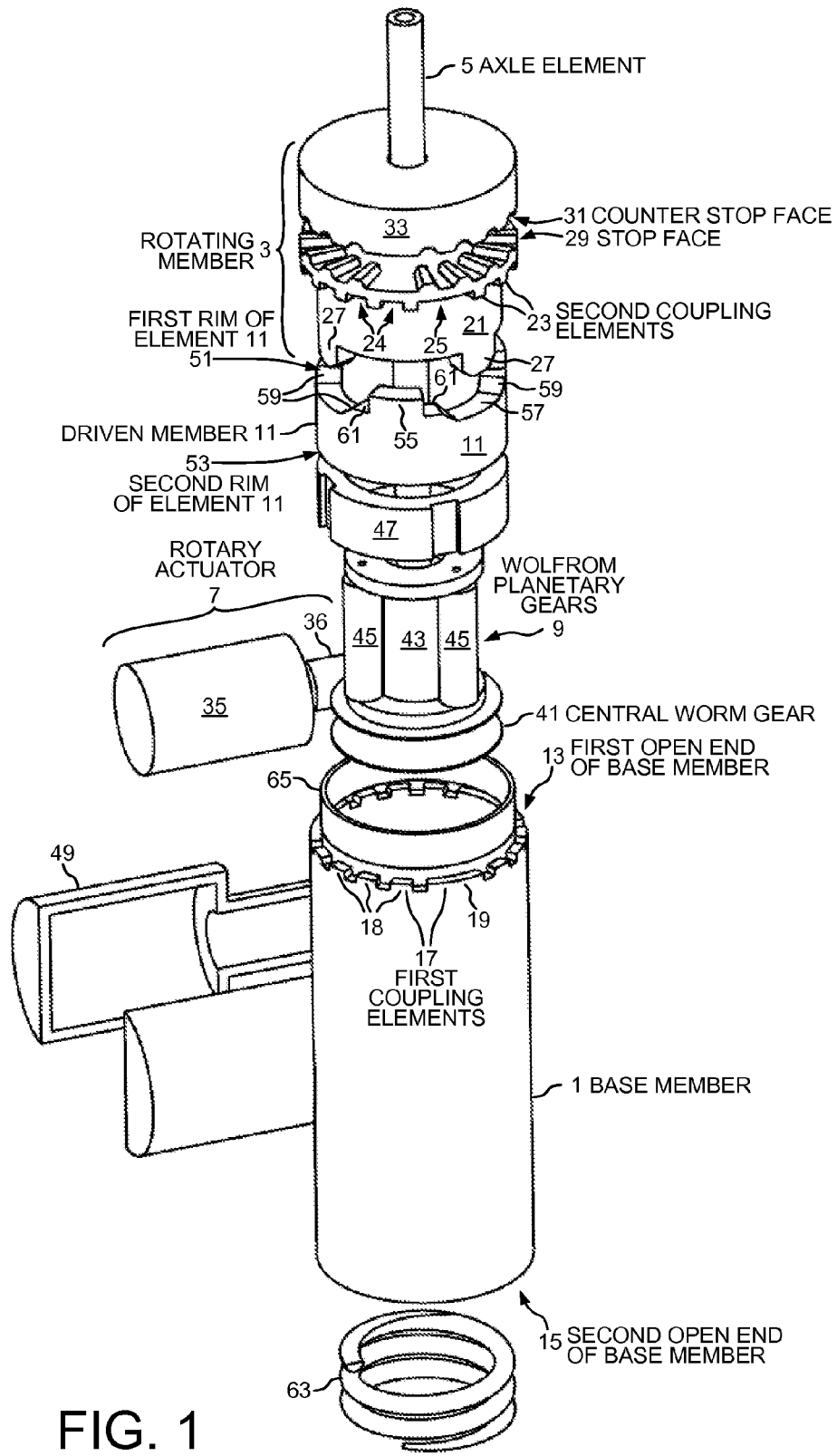
FIG. 1 shows an exploded view of an exemplary first embodiment of the invention.

Reference will now be made in detail to some embodiments of the invention, examples of which are illustrated in the accompanying drawings.

A device for rotationally adjusting a vehicular indirect visual system, such as a side mirror or a remote side or rear video camera, directly transmits the forces and moments occurring during use between a base member and the rotating member via a coupling device. In the neutral position in which the electric rotary actuator is deactivated, the coupling device couples the base member to the rotating member in a rotationally fixed manner and uncouples the electric rotary actuator from the rotating member. Upon activation of the electric rotary actuator, the coupling device uncouples the base member from the rotating member and couples the electric rotary actuator to the rotating member.

The direct and immediate coupling between the base member and the rotating member is disengaged only when the electric rotary actuator is activated, for example, when the side mirror is folded inward in a parking position. The electric rotary actuator is activated only for the short period of time during which no excessive forces act on the base member and the rotating member. Consequently, the electric rotary actuator can be designed to withstand only comparatively small forces and moments and can be correspondingly small.

The coupling device includes first coupling elements and at least one decoupling element disposed near the rotating member. Associated second coupling elements are disposed on the base member. The first and second coupling elements mesh with each another upon the coupling of the base member to the rotating member. The driven member has a geometry that causes the two coupling elements to be separated upon actuation of the electric rotary actuator so that the base member is uncoupled from the rotating member.

At least one decoupling element is a decoupling lug, and at least one driving element is a driving lug. Upon actuation of the electric rotary actuator, the decoupling lugs slide along the inclined portions of the rim of the driven member and thus force the rotating member and the driven member apart in the axial direction so that the two coupling elements are separated, and the base member and the rotating member are uncoupled from each other. Instead of inclined portions, a groove extending in V-shape can also be used, in which a decoupling lug having a hemispherical end slides along and thus increases the distance between the driven member and the rotating member and separates the two coupling elements from each other.

In the neutral position, the coupling between the base member and the rotating member is maintained. Upon activation of the electric rotary actuator, the uncoupling of the base member and the rotating member can be performed only against the resistance of a spring element or an elastic element. The two coupling elements can take the form of a dog coupling.

The driven member can have an annular configuration to enable rotary movements. A stable design in which no tilting moments occur can be achieved using a plurality of, preferably three, driving lugs and a plurality of inclined portions. This is applicable in particular when a decoupling lug at the rotating member is associated with each driving lug at the driven member.

Individual components of the device for rotational adjustment can be manufactured with lower manufacturing tolerances. A plateau face allows the driven member first to move about a small angle before the decoupling lug reaches the inclined portion and the decoupling operation starts.

Upon deactivation of the electric rotary actuator, the decoupling lug slides downwards along the inclined surface assisted by the spring force of the elastic element, and the two coupling elements are automatically engaged again. Thus the adjusting unit automatically returns to the neutral position, i.e., the base member and the rotating member are coupled to each other in a rotationally fixed manner. The device for rotational adjustment provides a torque that is sufficient for adjusting a mirror while at the same time having a small construction volume. In addition, existing common components, such as Wolfrom planetary gearing, can be used. Upon deactivation of the electric actuator, the two coupling elements can again be engaged by an elastic element. Tilted shoulders of the trapezoidal coupling elements facilitate the sliding of the decoupling elements into and apart from each other. In this way, the coupling and the uncoupling of the two coupling elements are assisted.

The device for rotational adjustment provides a maximum angle of rotation, i.e., the angle at which a mirror is completely folded in. The point at which the maximum angle of rotation or the stopping point is reached is detected by monitoring the current intensity consumed by the electric rotary actuator. Upon reaching the stopping point, the current intensity increases and thus can be detected by a sensor and control device. If so, the direction of rotation is shortly reversed so that the two coupling elements can be engaged again. The first and second coupling elements are designed so that the coupling elements can be reengaged only upon rotation about a particular angle. In this way, a minimum angle of rotation between two neutral positions is set. The point at which the particular angle $\psi$ is reached is detected based on the current consumption of the electric rotary actuator. A reduced current consumption of the electric rotary actuator is detected when the position is reached at which the coupling elements can be reengaged.

The device for rotational adjustment automatically reverts to a folded position upon impact with an excessive force, for example, in the case of a collision with an obstacle.

The electric rotary actuator of the rotational adjustment device can also be a step motor that drives the driven member directly. Alternatively, the driven member can be driven through a gearing. In the case of direct drive without a gearing, the step motor can be arranged directly in the cylindrical base member.

The exploded view of the first embodiment of the invention shown in FIG. 1 shows a cylindrical base member 1 and a member 3 that rotate about an axle element 5. Thus, base member 1 and rotating member 3 are coaxially aligned. The axle element 5 is supported in the base member 1. The base member 1 is connected to an electric rotary actuator 7 that includes Wolfrom planetary gears 9 through which the axle element 5 is passed. The Wolfrom gears 9 drive an annular driven member 11.

Figure 5:
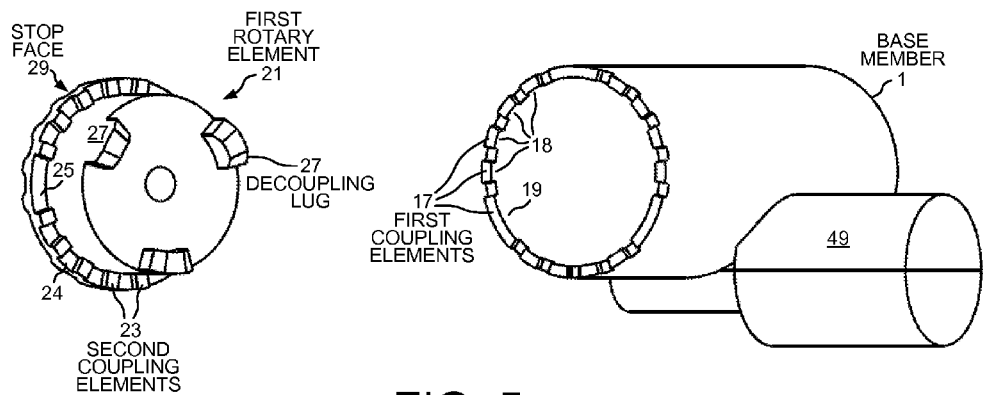
FIG. 5 shows a perspective view of the first and second coupling elements of the first embodiment.

The cylindrical base member 1 has a first open end 13 and an opposite second open end 15. At the first open end 13, first coupling elements 17 point in an axial direction. The first coupling elements 17 are configured in the form of projections or teeth of a first width 18 and of a second width 19. The number of coupling elements of the first narrower width 18 is larger than the number of the coupling elements of the second wider width 19. In one aspect, three first coupling elements 17 of the second wider width 19 are evenly distributed around the periphery of the first open end 13. Four coupling elements of the first narrower width 18 are disposed between each of the first coupling elements 17 of the second wider width 19 and are arranged around the periphery of the first open end 13 of the base member 1, as shown in FIG. 5.

The member 3 that rotates about axle element 5 includes a first rotary element 21 with second coupling elements 23 that are formed complementary to the first coupling elements 17. The second coupling elements 23 have recesses of a first narrower width 24 and recesses of a second wider width 25. The recesses of the first width 24 accommodate the first coupling elements 17 of the first width 18, and the recesses of the second width 25 accommodate the first coupling elements 17 of the second width 19. Due to this arrangement of first coupling elements 17 on the base member 1 and associated complementary second coupling elements 23 on the first rotary element 21 of the rotating member 3, the first and second coupling elements 17, 23 can mesh only at three particular angular positions. Thus, base member 1 and rotating member 3 are coupled in a rotationally fixed manner only at three particular rotational positions. The first rotary element 21 also includes three decoupling lugs 27 that are stepped radially inward and axially forward compared to the second coupling elements 23. The three decoupling lugs 27 are distributed evenly over the rim of the first rotary member 21 and extend axially away from the rim. A stop face 29 having a circular ring shape is disposed on the side of the first rotary element 21 opposite the decoupling lugs 27. The stop face 29 engages an associated counter stop face 31 on a second rotary element 33.

The electric rotary actuator 7 includes an electric motor 35 and a drive worm 36. The Wolfrom gears 9 include a central sun gear 43 that is connected to a central worm gear 41 in a rotationally fixed manner. The Wolfrom gears 9 are driven by the drive worm 36 engaging in the worm gear 41. The central sun gear 43 drives three associated planetary gears 45, which in turn engage a ring gear 47 as well as the internal toothing of the driven member 11. The ring gear 47 is stationary with respect to the base member 1. As is evident from FIGS. 3 and 4, the Wolfrom gears 9 are arranged within the cylindrical base member 1. The electric motor 35 and the drive worm 36 are arranged transversely to the base member 1. The drive worm 36 engages the worm gear 41 via an opening in the base member 1. The electric motor 35 and the drive worm 36 are covered and protected against atmospheric influences by cover elements 49.

The driven member 11 with a circular ring shape includes an internal toothing to which the planetary gears 45 of the Wolfrom gears 9 engage. The driven member 11 has a first rim 51 and an opposite second rim 53. Three driving lugs 55 are evenly distributed around the periphery of the first rim 51. The driving lugs 55 on driven member 11 extend away from the first rim 51 in an axial direction and face the decoupling lugs 27. A lower plateau face 57 is disposed between each of the three driving lugs 55. To the left and right of each lower plateau face 57 are two inclined faces 59. To the left and right of each of the inclined faces 59 are two upper plateau faces 61. The two upper plateau faces 61 end on the left and on the right at the walls of the driving lugs 55. Thus, along first rim 51 the following upper surfaces are repeated: top surface of driving lug 55, first upper plateau face 61, first inclined face 59, lower plateau face 57, second inclined face 59, second upper plateau face 61, and then the top surface of the next driving lug. When the driven member 11 is rotated by the electric rotary actuator 7, the decoupling lugs 27 slide on the lower plateau faces 57, up the inclined faces 59 and onto the upper plateau faces 61 and come into contact with the walls of the driving lugs 55.

Figure 2:
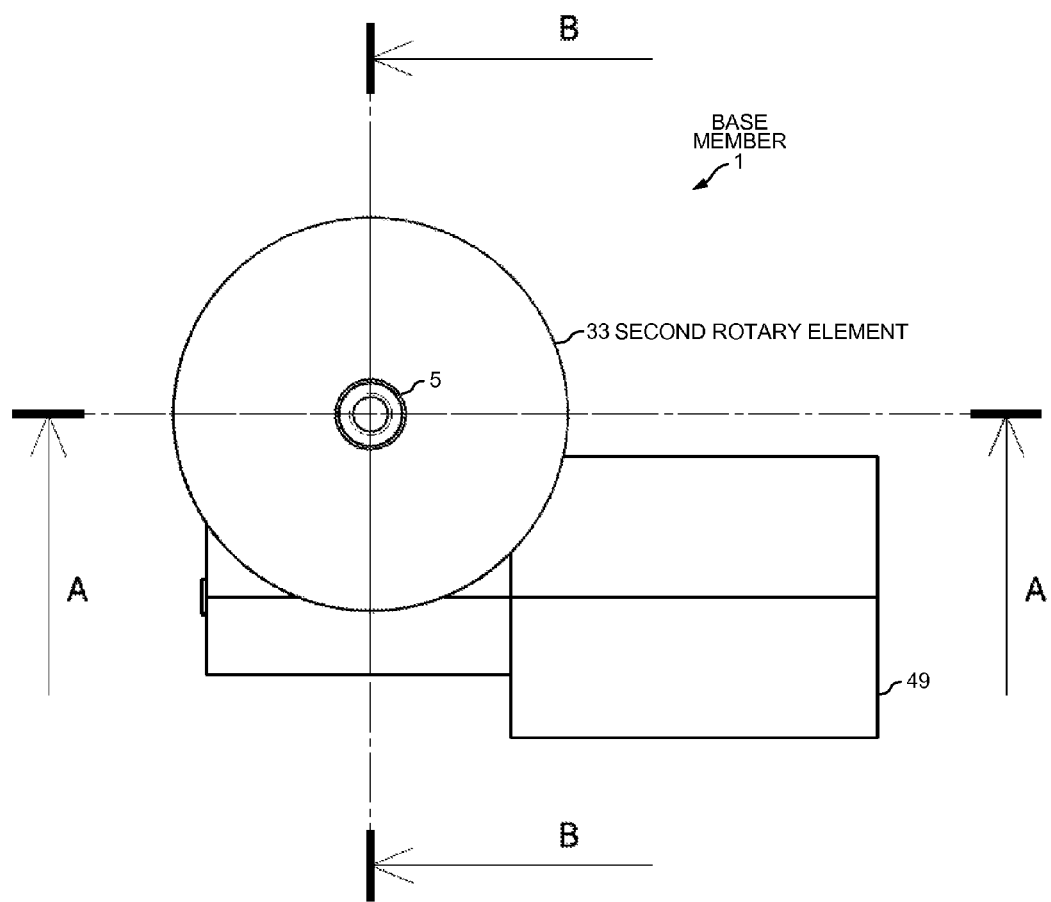
FIG. 2 shows a top view of the first embodiment of the invention.
Figure 3A:
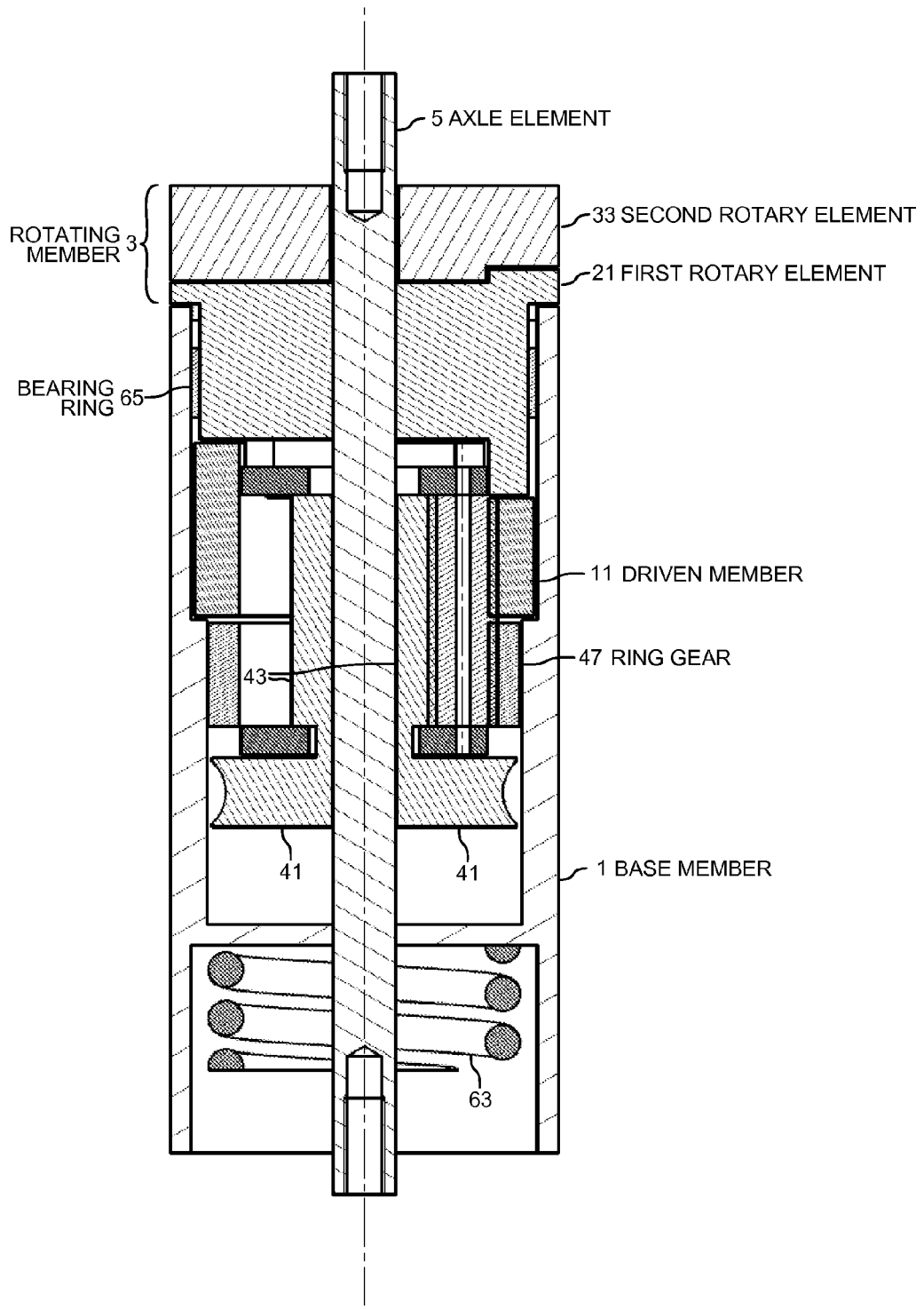
FIG. 3A shows a section along A-A in FIG. 2 in the coupled state (neutral position).
Figure 3B:
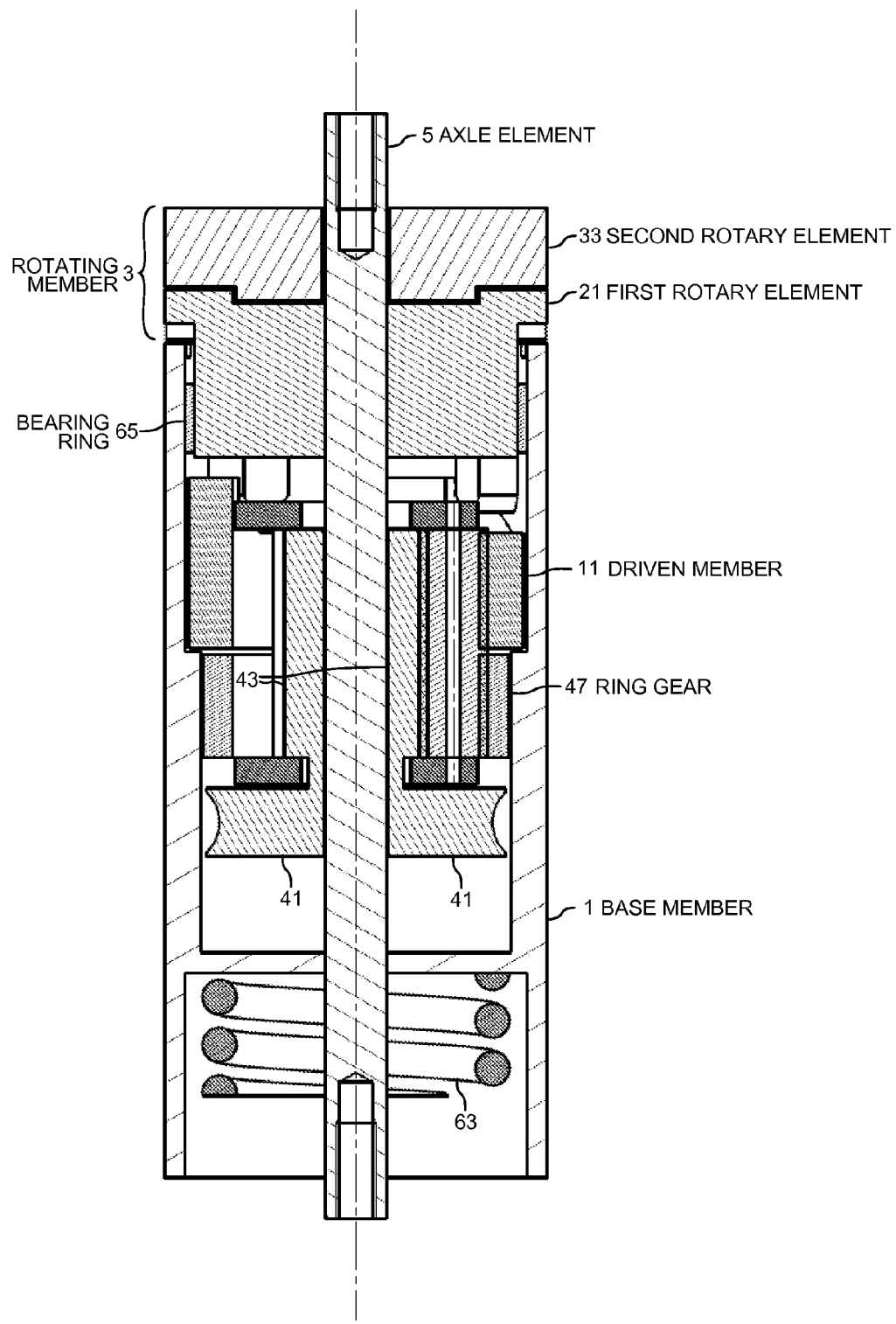
FIG. 3B shows a section along A-A in the uncoupled state (electric rotary actuator active).
Figure 4:
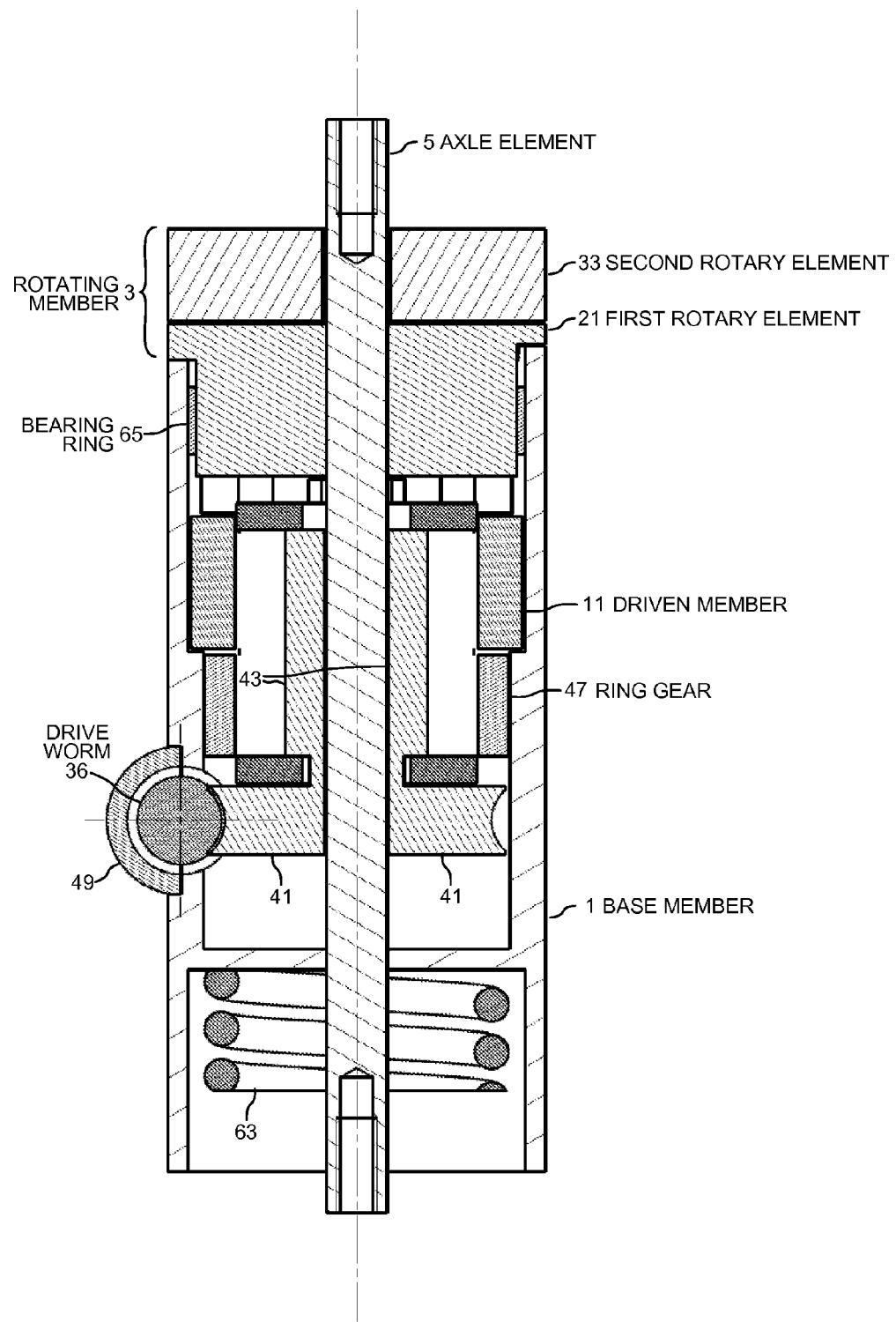
FIG. 4 shows a section along B-B in FIG. 2.

FIG. 2 shows a top view of the first embodiment of the invention. FIG. 3A is a cross-sectional view along plane A-A in FIG. 2 in the coupled state. FIG. 3B is a cross-sectional view along plane A-A in FIG. 2 in the uncoupled state with the electric rotary actuator 7 active. FIG. 4 is a cross-sectional view along plane B-B in FIG. 2. FIGS. 3A-B and 4 show that all of the Wolfrom gears 9, the driven member 11 and the major part of the first rotary element 21 are disposed inside the cylindrical base member 1. The individual components are braced against one another via the axle element 5 and an elastic element in the form of a spiral spring 63 that acts upon the base member 1. The driven member 11 is rotatably supported inside the base member 1 through a bearing ring 65. The Wolfrom gears 9 are self-locking. The planetary gears 45 stop and do not continue rotating in the currentless state.

Figure 6:
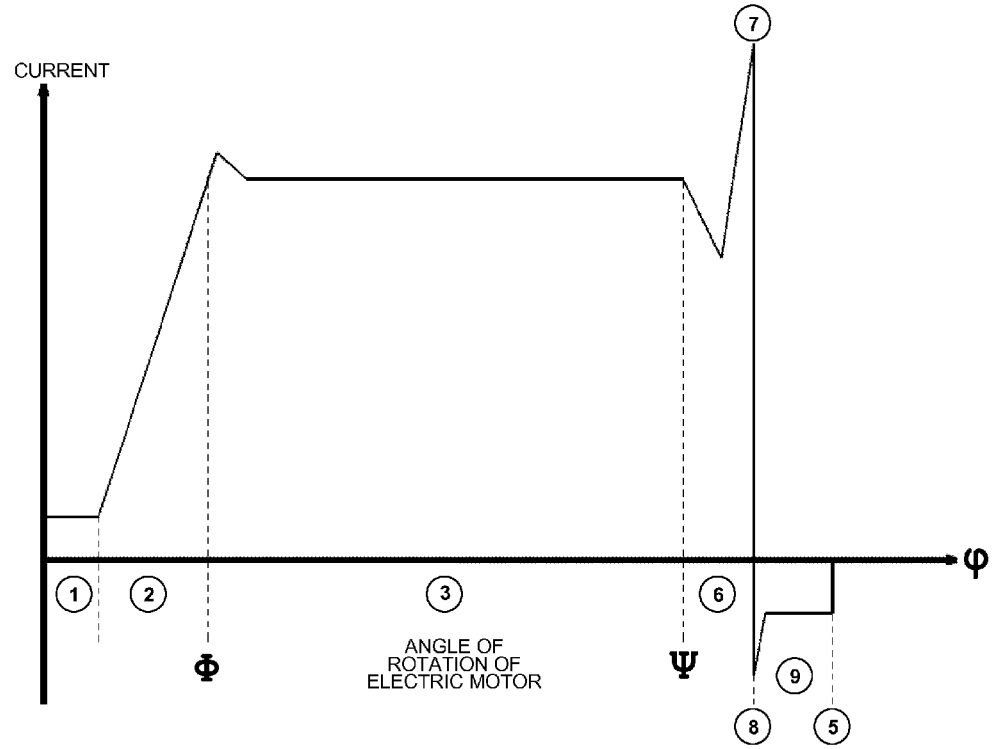
FIG. 6 shows the current consumption of the electric rotary actuator as a function of the angle of rotation with a self-locking gearing and a driven member according to FIG. 1.

The functioning of the first embodiment according to FIGS. 1 4 is now described by the current waveform shown in FIG. 6. FIG. 6 shows the current consumption of the electric motor 35 as a function of the angle of rotation $\phi$ of the electric motor 35 and of the driven member 11. The maximum angle of rotation $\psi$ is adjustable and set by a mechanical stop (not shown). In the neutral position, i.e., when the electric rotary actuator 7 is inactive, the base member 1 and the first rotary member 3 are connected via the two coupling elements 17 and 23 in a rotationally fixed manner. In phase 1 of FIG. 6, when the electric rotary actuator 7 is activated, the decoupling lugs 27 first drag on the lower plateau faces 57 of the driven member 11. Then in phase 2, the decoupling lugs 27 slide along the inclined faces 59 and force the rotating member 3 and the driven member 11 axially apart and thus disconnect the first coupling elements 17 from the second coupling elements 23 at the decoupling angle $\Phi$. After the decoupling of the two coupling elements 17 and 23, the decoupling lugs 27 reach the upper plateau faces 61 and abut against the walls of the driving lugs 55 of the driven member 11. The rotation of the driven member 11 is transmitted via the driving lugs 55 to the decoupling lugs 27 and thus to the first rotary element 21 and the rotating member 3. For example, an external side mirror of a vehicle is pivoted or folded in or out when rotating member 3 is rotated. In phase 3, the rotating member 3 is being rotated. In phase 3, the free ends of the two coupling elements 17 and 23 slide along each other.

Phase 6 illustrates the current consumption of the electric motor 35 after the angular position ψ is reached. When the angular position ψ of the two coupling elements 17, 23 is reached at the position at which they can re-engage, the current consumption of the electric rotary actuator 7 decreases because the friction between the two coupling elements 17 and 23 decreases. At point 7, the mechanical stop is reached. When the mechanical stop is reached, the current consumption greatly increases. This current increase is detected by a sensor and control device (not shown), and the direction of rotation of the electric motor 36 and thus of the driven member 11 is reversed at point 8.

In phase 9, the direction of rotation is reversed, and the decoupling lugs 27 slide from the upper plateau faces 61 down along the inclined faces 59 to the lower plateau faces 57 of the driven member 11. Due to the spring bias via the spiral spring 63, the first and second coupling elements 17, 23 are engaged again so that the base member 1 and the rotating member 3 are coupled again in a rotationally fixed manner. In the neutral position, the electric rotary actuator 7 has been deactivated and is mechanically disengaged from the rotating member 3.

Figure 7:
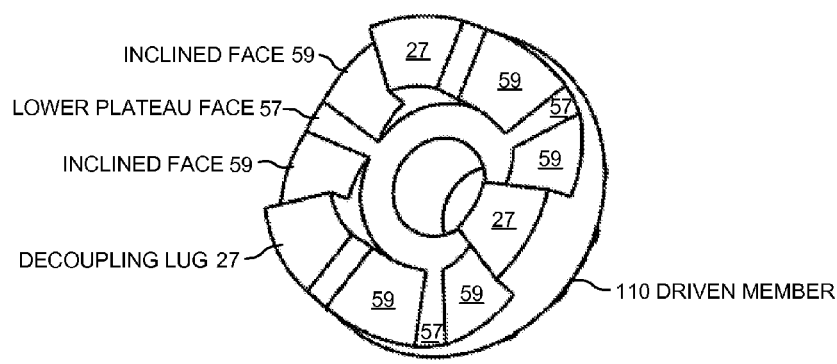
FIG. 7 shows an alternative configuration of the driven member according to a second embodiment of the invention for an automatic coupling of the base member and the rotating member due to a spring bias.
Figure 8:
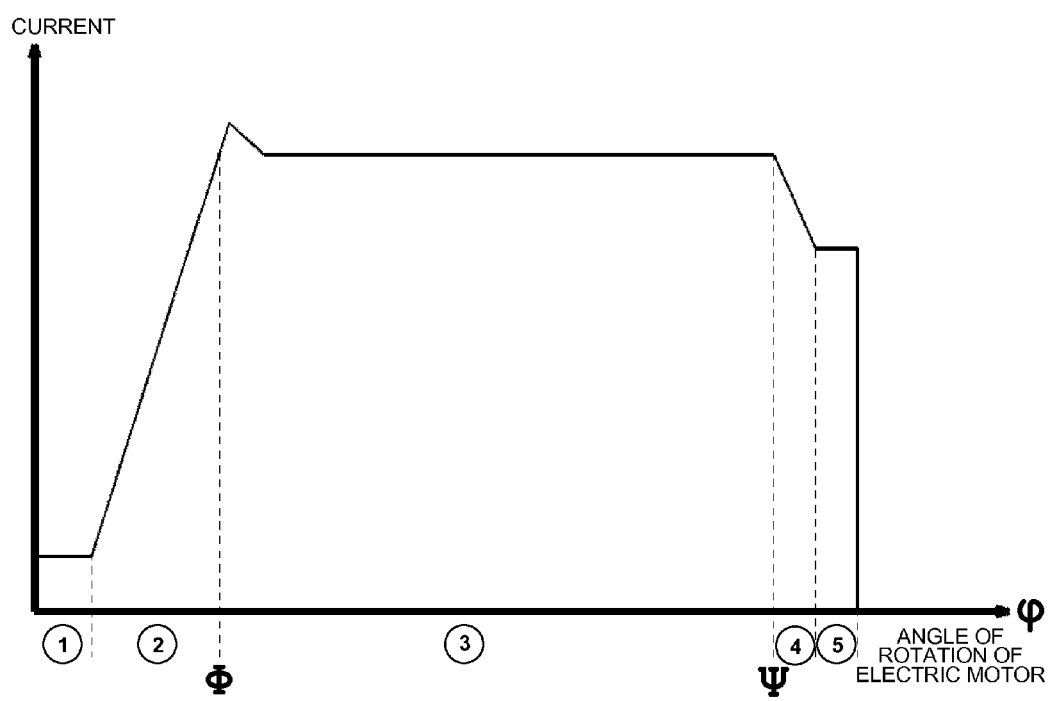
FIG. 8 shows the current consumption of the electric rotary actuator as a function of the angle of rotation in the case of a non-self-locking gearing an a driven member according to FIG. 7.

FIGS. 7-8 illustrate a second embodiment of the invention. The second embodiment differs from the first embodiment by the configuration of the driven member 110. Compared to the driven member 11 of the first embodiment, driven member 110 has no upper plateau faces 61, and the inclined faces 59 end directly at the walls of the driving lugs 55. In addition, the gearing is designed not to be self-locking, i.e., the gearing can be rotated in the currentless state.

FIG. 8 illustrates the current consumption of the electric motor 35 during the transition from the neutral position to the uncoupled state and back again to the neutral position. In the neutral position, the electric rotary actuator 7 is deactivated, and the base member 1 and the rotating member 3 are connected in a rotationally fixed manner via the two coupling elements 17, 23. In the uncoupled state, the electric rotary actuator 7 is active. FIG. 8 illustrates, analogously to FIG. 6, the current consumption of the electric motor 35 as a function of the angle of rotation of the electric motor 35 and of the driven member 11. In the neutral position when the electric rotary actuator 7 is inactive, the base member 1 and the first rotary member 3 are connected to be rotationally fixed via the two coupling elements 17 and 23.

Phase 1 of FIG. 8 illustrates when the electric rotary actuator 7 is activated and the decoupling lugs 27 first drag on the lower plateau faces 57 of the driven member 11. Then in phase 2, the decoupling lugs 27 slide along the inclined faces 59 and force the rotating member 3 axially apart from the driven member 11 and thus disconnect the first coupling elements 17 from the second coupling elements 23. At the end of the inclined faces 59, the decoupling lugs 27 abut against the driving lugs 55 of the driven member 11. The rotation of the driven member 11 is transmitted via the driving lugs 55 to the decoupling lugs 27 and thus to the first rotary element 21 and the rotating member 3. After the decoupling lugs 27 abut against the driving lugs 55, the mirror is pivoted in phase 3. In phase 3, the free ends of the two decoupling elements 17 and 23 slide past each other.

Phase 4 begins when the first angular position ψ is reached at which the two coupling elements 17, 23 can re-engage. When the first angular position ψ is reached, the current consumption of the electric rotary actuator 7 decreases because the friction between the two coupling elements 17, 23 decreases. The current drop is detected by a sensor and control device, and the electric rotary actuator 7 is turned off during phase 5. Due to the inclined faces 59 and the spring bias by the spiral spring 63, the driven member 110 and the rotating member 3 are forced together in the axial direction. The decoupling lugs 27 slide "downwards" along the inclined faces 59 to the lower plateau faces 57 so that the two coupling elements 17 and 23 are automatically engaged again, and the base member and the rotating member 3 are coupled to be rotationally fixed again. The neutral position has again been reached.

Because it can be difficult and complicated to detect the current drop in phase 4 of FIG. 8, the second embodiment can also use a mechanical stop. The mechanical stop is additionally provided so that merely a strong current increase upon reaching the mechanical stop is required to turn off the electric rotary actuator 7, as in the first embodiment of FIG. 6. Then the spring bias of the spiral spring 63 causes the neutral position to be reached again due to the missing upper plateau faces on the driven member 110.

The division of the rotating member 3 into a first rotary element 21 with the stop face 29 and a second rotary element 33 with the counter stop face 31 as provided in both exemplary embodiments provides for the function of an emergency latch. In the event of a collision of the mirror with an obstacle, the mirror folds into the folded position by the stop face 29 and the counter-stop face 31 without burdening the electric rotary actuator 7. The torque at which the emergency latch is triggered is set by the geometric configuration of the stop face 29 and the counter stop face 31 and by the strength of the spiral spring 63.

LIST OF REFERENCE NUMERALS 1 base member
3 rotating member
5 axle element
7 electric rotary actuator
9 Wolfrom gears
11 driven member
13 first open end of 1
15 second open end of 1
17 first coupling elements
18 first coupling elements of a first width
19 first coupling elements of a second width
21 first rotary element
23 second coupling elements
24 recesses of a first width
25 recesses of a second width
27 decoupling lugs on 21
29 stop face
31 counter-stop face
33 second rotary element
35 electric motor
36 drive worm
41 worm gear
43 sun gear
45 planetary gears
47 ring gear
49 cover
51 first rim of 11
53 second rim of 11
55 driving element, driving lugs at 11 and 110
57 lower plateau faces
59 inclined faces
61 upper plateau faces
63 spiral spring
65 bearing ring
110 driven member Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A device comprising:
a cylindrical base member with first coupling elements;
a rotating member with second coupling elements, wherein the cylindrical base member and the rotating member are coaxially aligned;
an elastic element that exerts a spring force that presses the rotating member axially towards the cylindrical base member; and
an electric motor adapted to drive the rotating member, wherein the first coupling members mesh into the second coupling members and couple the cylindrical base member to the rotating member in a rotationally fixed manner when the electric motor is not driving the rotating member, and wherein the first coupling members become uncoupled from the second coupling members when the electric motor rotates the rotating member such that the rotating member is pushed against the spring force axially away from the cylindrical base member.

2. The device of claim 1, further comprising:
an external mirror of a vehicle, wherein the external mirror of the vehicle moves when the electric motor is driving the rotating member.

3. The device of claim 1, wherein the rotating member is uncoupled from the electric motor when the electric motor is not rotating the rotating member.

4. The device of claim 1, wherein the first coupling members point in an axial direction, and wherein the second coupling members point in a direction opposite to the axial direction in which the first coupling members point.

5. The device of claim 1, further comprising:
a cylindrical driven member coaxially aligned with the cylindrical base member and the rotating member, wherein the cylindrical driven member includes a driving element that points in an axial direction, wherein the rotating member includes a decoupling element that points in a direction opposite to the axial direction in which the driving element points, and wherein the rotating member is forced axially apart from the cylindrical base member by the decoupling element when the cylindrical driven member is rotated.

6. The device of claim 1, further comprising:
a cylindrical driven member coaxially aligned with the cylindrical base member and the rotating member, wherein the cylindrical driven member includes an inclined portion, wherein the rotating member includes a decoupling element that points in an axial direction, and wherein the rotating member is forced axially apart from the cylindrical base member and the first coupling members are uncoupled from the second coupling members as the cylindrical driven member is rotated and the decoupling element slides along the inclined portion.

7. The device of claim 1, wherein the elastic element is a spring, further comprising:
a cylindrical driven member coaxially aligned with the cylindrical base member and the rotating member, wherein the cylindrical driven member includes a rim with an inclined portion, wherein the rotating member includes a decoupling element that points in an axial direction, and wherein when the electric motor stops rotating the rotating member, the decoupling element slides downwards along the inclined portion assisted by the spring, and the first coupling members recouple to the second coupling members.

8. The device of claim 1, further comprising:
a mechanical stop;
a driven member coaxially aligned with the cylindrical base member and the rotating member; and
a sensor and control device that senses an increased current through the electric motor when the driven member reaches a mechanical stop after being rotated by the electric motor.

9. The device of claim 1, further comprising:
a driven member disposed inside the cylindrical base member, wherein the cylindrical driven member has a rim that includes an inclined portion, wherein the rotating member includes a decoupling element, and wherein the rotating member is forced axially apart from the cylindrical base member as the cylindrical driven member is rotated and the decoupling element slides along the inclined portion.

10. The device of claim 5, wherein the rotating member is forced axially apart from the cylindrical base member by the decoupling element when the cylindrical driven member is rotated up to a decoupling angle $\phi$.

11. The device of claim 10, wherein the driving element engages the decoupling element and rotates the rotating member when the cylindrical driven member is rotated past the decoupling angle $\phi$.

12. A device comprising:
a cylindrical base member with first coupling elements;
a rotating member with second coupling elements, wherein the cylindrical base member and the rotating member are coaxially aligned;
an electric motor adapted to drive the rotating member, wherein the first coupling members mesh into the second coupling members and couple the cylindrical base member to the rotating member in a rotationally fixed manner when the electric motor is not rotating the rotating member, and wherein the first coupling members are uncoupled from the second coupling members when the electric motor is rotating the rotating member; and
a cylindrical driven member that includes an inclined portion and a driving element, wherein the driving element and the inclined portion are formed on a rim of the cylindrical driven member, wherein the rotating member includes a decoupling element, and wherein the rotating member is forced axially apart from the cylindrical base member as the decoupling element slides up the inclined portion when the cylindrical driven member is rotated by the electric motor.

13. The device of claim 12, further comprising:
Wolfrom planetary gears, wherein the electric motor rotates the cylindrical driven member using the Wolfrom planetary gears.

14. A device comprising:
a cylindrical base member;
a driven member;
a rotating member that includes a decoupling element, wherein the cylindrical base member, the driven member and the rotating member are all coaxially aligned; and an electric motor, wherein the rotating member is forced axially apart from the cylindrical base member by the decoupling element when the electric motor rotates the driven member.

15. The device of claim 14, wherein the rotating member is forced axially apart from the cylindrical base member by the decoupling element when the electric motor rotates the driven member up to a decoupling angle $\phi$.

16. The device of claim 14, wherein the rotating member is coupled to the cylindrical base member in a rotationally fixed manner when the electric motor is not rotating the driven member.

17. The device of claim 14, wherein an inclined portion is formed on a rim of the driven member, and wherein the rotating member is forced axially apart from the cylindrical base member as the decoupling element slides up the inclined portion when the electric motor rotates the driven member.

18. The device of claim 14, wherein the driven member includes a driving element, wherein the rotating member is forced axially apart from the cylindrical base member by the decoupling element when the driven member is rotated up to a decoupling angle $\phi$, and wherein the driving element engages the decoupling element and rotates the rotating member when the driven member is rotated past the decoupling angle $\phi$.

19. The device of claim 15, wherein the driven member includes a driving element that engages the decoupling element and rotates the rotating member when the driven member is rotated past the decoupling angle $\phi$.

20. The device of claim 19, further comprising:
   an external mirror of a vehicle, wherein the external mirror of the vehicle moves when the driven member is rotated past the decoupling angle $\phi$.

* * * * *